Figure 1:
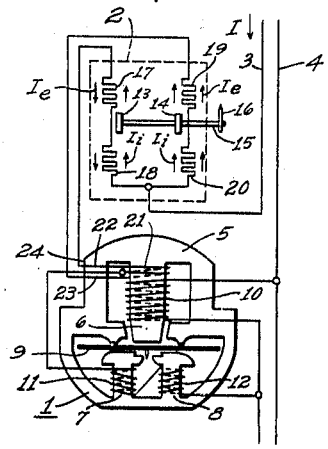

Nov. 2, 1943.    T. D. BARNES    2,333,509
THERMAL DEMAND METER
Filed Aug. 22, 1941

WITNESSES:
C. J. Weller.
C. L. Freedman

INVENTOR
Thomas D. Barnes.
BY
ATTORNEY

Patented Nov. 2, 1943

2,333,509

UNITED STATES PATENT OFFICE 2,333,509

THERMAL DEMAND METER

Thomas D. Barnes, West Orange, N. J., assignor to Westinghouse Electric & Manufacturing Company, East Pittsburgh, Pa., a corporation of Pennsylvania Application August 22, 1941, Serial No. 407,898

6 Claims. (Cl. 171—34)

This invention relates to alternating-current instrumentalities, and it has particular relation to the combination of watthour meters and thermal maximum demand units for integrating, and measuring the maximum demand of, electrical energy.

In numerous alternating-current electrical instrumentalities such as electrical measuring instruments and electrical relays, windings are provided for producing magnetic flux. For example, in an alternating-current induction watthour meter voltage and current windings are provided on a magnetic structure for producing a shifting magnetic field in an air gap. An electroconductive armature is positioned in the air gap for rotation by the magnetic field.

In such instrumentalities, auxiliary sources of energy often are required for various purposes. For example, when an induction watthour meter is associated with a thermal maximum demand unit, auxiliary sources of energy are provided for the thermal maximum demand unit.

In the case of a watthour meter, it is convenient to derive a portion of the auxiliary energy from the voltage winding. This voltage winding comprises a large number of turns of small diameter electrical conductor which are associated in side by side relationship to provide a winding of substantial length.

In accordance with the invention, an auxiliary winding is provided formed from an electroconductive ribbon of substantial width. This ribbon is wound about the desired winding, such as the voltage winding of a watthour meter, in inductively coupled relationship therewith. Since each turn of the ribbon substantially surrounds the voltage winding, good mechanical protection is afforded the fine conductor of the voltage winding. In addition, the auxiliary winding contributes to the uniform heat distribution in the voltage winding and uniform heat dissipation therefrom. Furthermore, the ribbon construction of the auxiliary winding assures ample current carrying capacity. For insulating the turns of the auxiliary winding, a ribbon of insulating material may be interleaved therewith. This construction facilitates the mounting of a thermal demand unit and a watthour meter in a common enclosure as shown in the copending Smith application, Serial No. 393,343, filed May 14, 1941, which issued July 6, 1943, as Patent No. 2,323,732.

It is, therefore, an object of the invention to provide an improved auxiliary source of electrical energy for an alternating-current instrumentality.

It is a further object of the invention to provide an auxiliary winding for a coil having a large number of turns of small conductor, in the form of a ribbon having a width sufficient to cover a substantial number of turns of the coil.

It is a still further object of the invention to provide a watthour meter for association with a thermal maximum demand unit having one or more auxiliary windings surrounding the voltage winding of the watthour meter wherein each turn of the auxiliary windings is formed of an electroconductive ribbon substantially surrounding the voltage winding.

Figure 4:
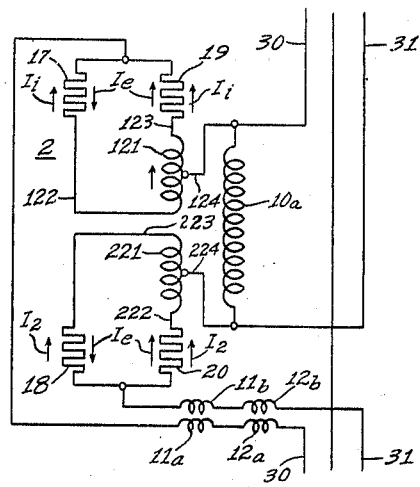
Figure 2:
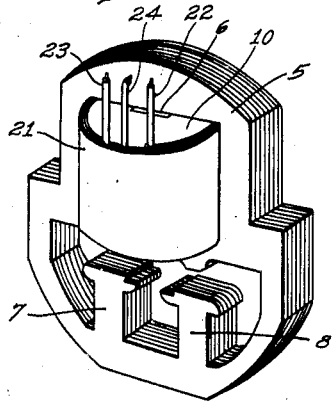
Figure 5:
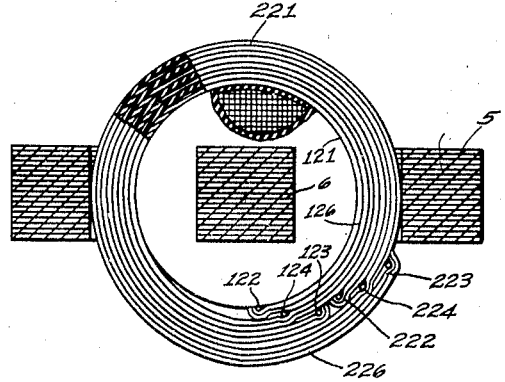
Figure 3:
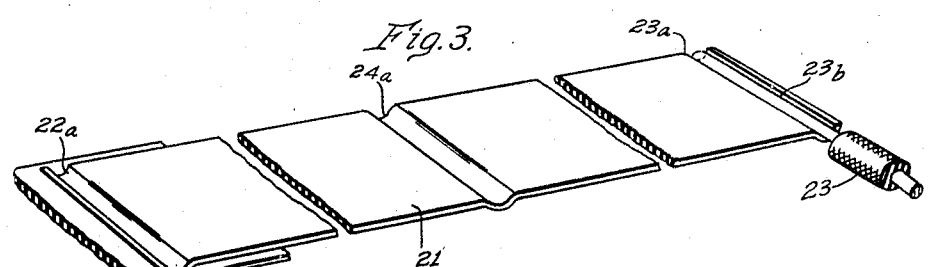

Other objects of the invention will be apparent from the following description taken in conjunction with the accompanying drawing, in which:

Figure 1 is a schematic view showing the connections of a watthour meter and a thermal maximum demand unit associated with a two-wire single-phase alternating-current circuit, Fig. 2 is a view in perspective with parts broken away of an electromagnet suitable for the watthour meter of Fig. 1, Fig. 3 is a detail view in perspective of a winding employed in the electromagnet of Fig. 2, Fig. 4 is a schematic view of a watthour meter and thermal maximum demand unit associated with a three-wire alternating-current circuit, and Fig. 5 is a view in cross section of an electromagnet suitable for the watthour meter of Fig. 4.

Referring to the drawing, Fig. 1 shows a watthour meter 1 and a thermal maximum demand unit 2 associated with a single-phase alternating-current circuit having conductors 3 and 4.

The watthour meter 1 includes an electromagnet having a magnetic structure 5. This magnetic structure 5 is provided with a voltage pole 6 and current poles 7 and 8 which are spaced to define an air gap. An electroconductive armature or disk 9 is mounted on a suitable shaft for rotation in the air gap.

For energizing the watthour meter 1, a voltage coil or winding 10 sourrounds the voltage pole 6; and current coils or windings 11 and 12 surround the current poles 7 and 8. As well understood in the art, when the voltage and current windings are energized in accordance with the voltage and current of an alternating-current circuit, a shifting magnetic field is produced in the air gap containing the armature 9. Under the influence of this magnetic field, a torque is produced operating to rotate the armature 9. In accordance with standard practice, a permanent magnet (not shown) may be employed for damping the armature 9.

The thermal maximum demand unit 2 includes a pair of bimetallic springs 13 and 14 which are mounted on a common shaft 15 for actuating a pointer 16 carried by the shaft. The bimetallic springs are so disposed on the shaft 15 that when heated, they tend to rotate the shaft in opposite directions.

Heating of the bimetallic spring 13 is effected by two electrical resistance heaters 17 and 18. In an analogous manner, heating of the bimetallic spring 14 is effected by electrical resistance heaters 19 and 20.

In operation, each of the heaters is energized by two current components $I_1$ and $I_e$ which are proportional, respectively, to the current and voltage of the associated alternating-current circuit. For this purpose, the heaters 17 and 18 are connected in series in one arm of a parallel circuit, whereas the heaters 19 and 20 are connected in series in the remaining arm of the parallel circuit. This parallel circuit is connected in series with the conductor 3. Consequently, each of the current components $I_1$ flowing through the various heaters is equal to one-half the current flowing in the conductor 3.

For energizing the thermal maximum demand unit 2 in accordance with the voltage of the associated alternating-current circuit, an auxiliary winding 21 is placed around the voltage pole 6 in inductively coupled relationship to the voltage winding 10. Consequently, when the voltage winding 10 is energized, a voltage is induced in the auxiliary winding 21 which is proportional to the voltage of the associated alternating-current circuit. Since the terminals 22 and 23 of the auxiliary winding 21 are connected to the heaters 17 and 19, it will be observed that the four heaters 17, 18, 19 and 20, together with the auxiliary winding 21 are connected in a local series circuit. Consequently, the voltage induced in the auxiliary winding 21 forces the current component $I_e$ through the four heaters. This current component $I_e$ is proportional to the voltage of the alternating-current circuit.

The auxiliary winding 21 also is provided with a centrally disposed tap or terminal 24 which is connected in series relationship with the current windings 11 and 12. By inspection of Fig. 1, it will be noted that current flowing in the conductor 3 divides into two paths, one of which contains the heaters 17 and 18 and the other of which contains the heaters 19 and 20. The currents flowing in these two paths recombine in the tap 24 of the auxiliary winding 21 and pass through the current windings 11 and 12. Because of the central disposition of the tap 24, the auxiliary winding 21 offers exteremely low impedance to the flow of this current.

Instantaneous directions of current flow of the current components $I_1$ and $I_e$ in the thermal maximum demand unit 2 are indicated by arrows. As shown in Fig. 1, the bimetallic spring 13 is heated in accordance with the vector difference of the current components $I_1$ and $I_e$, whereas the bimetallic spring 14 is heated in accordance with the vector sum of these current components. As well understood in the art, the resulting rotation of the shaft 15 and of the pointer 16 is proportional to the maximum energy demand of the associated alternating-current circuit. A scale (not shown) may be associated with the pointer 16 for indicating this maximum demand. A thermal maximum demand unit of this type is shown and described in greater detail in the Smith Patent 1,417,695.

In Fig. 2, a desirable relationship for the various windings is clearly shown. In accordance with standard practice, the magnetic structure 5 may be formed of a plurality of laminations of soft iron. The voltage pole 6 of the magnetic structure is surrounded by the coil or winding 10 which generally is formed of a large number of turns of insulated fine copper wire. For example, a watthour meter designed for a 120 volt alternating-current circuit may have a voltage winding formed of 4000 turns of insulated #33 gage copper wire. The turns of wire may be associated in side by side relationship to form a coil having a length of the order of 1¼ inches. With a voltage winding of this type, it is desirable that the fine wire of the winding be adequately protected and that heat be uniformly distributed and dissipated therefrom. To this end the auxiliary winding 21 may be designed substantially to surround the voltage winding 10.

As more clearly shown in Fig. 3, the auxiliary winding 21 is formed of a strip or ribbon of electroconductive material, such as copper having a suitable thickness, such as .010 inch. The width of the ribbon may have a dimension which is a substantial part of the length dimension of the voltage winding 10, desirably more than ½ of this length dimension. In the specific example shown in the drawing, the width of the ribbon employed for the auxiliary winding 21 is substantially equal to the length of the voltage winding 10. The ribbon may be wound around the voltage winding to provide any desired number of turns. In the specific example illustrated in Fig. 2, the auxiliary winding 21 has two turns.

The turns may be insulated from each other and from other parts of the watthour meter in any suitable manner, as by coating the ribbon with an insulating varnish. An effective insulation is provided by a ribbon 26 of insulating material, such as insulating fiber or cellulose acetate. Conveniently, the ribbon 26 may have a width substantially equal to the width of the ribbon employed for the auxiliary winding. As shown in Fig. 3, however, the insulating ribbon 26 has a width slightly greater than the width of the winding 21. This permits the insulating ribbon 26 to protect the edges of the auxiliary winding 21. As will be understood by an inspection of Fig. 2, the insulating and copper ribbons are wound about the voltage winding 10 to provide interleaved insulating and conductive turns.

The terminals 22, 23 and 24 may be associated with the ribbon in any suitable manner. Preferably, however, the terminals comprise sections of insulated wire having the insulation stripped from their ends. For example, the terminal 23 may have its bare end 23b positioned transversely across the copper ribbon employed for the auxiliary winding. If desired, the end 23b may rest on the smooth surface of the ribbon. As shown in Fig. 3, however, the ribbon may be provided with grooves 22a, 23a and 24a for receiving, respectively, the ends of the terminals 22, 23 and 24. The terminals may be attached to the ribbon in any convenient manner as by soldering, welding or brazing. The disposition of the terminals transversely of the ribbon assures uniform current distribution in the ribbon and permits a compact grouping of the terminals.

Referring to Figs. 4 and 5, a modification of the invention is illustrated which is suitable for the measurement of electrical energy in three-wire, single-phase alternating-current circuits. In this modification, a watthour meter having a magnetic structure 5 similar to the magnetic structure of Fig. 1 may be employed. This magnetic structure is provided with a voltage winding 10a which corresponds to the voltage winding 10 of Fig. 1, and which is connected to the main conductors 30 and 31 of the three-wire circuit. The current winding 11 on the current pole 7 of Fig. 1 is replaced by two current windings 11a and 11b which are located, respectively, in the conductors 30 and 31. Similarly, the current winding 12 on the current pole 8 of Fig. 1 is replaced by two current windings 12a and 12b located, respectively, in the conductors 30 and 31. A watthour meter having windings connected, as illustrated in Fig. 4, will correctly integrate the electrical energy flowing in the three-wire circuit, as well understood in the art.

In order to measure the maximum demand of energy in the three-wire circuit of Fig. 4, the thermal maximum demand unit 2 of Fig. 1 may be employed. The only changes required are in the connections of the heaters 17 to 20. For example, the heaters 17 and 19 in Fig. 4 are connected in a local series circuit with an auxiliary winding 121 which corresponds to the winding 21 of Fig. 1. The auxiliary winding 121 is inductively coupled to the voltage winding 10a and has a voltage induced therein which is proportional to the voltage across the main conductors 30 and 31. This induced voltage forces a current component $I_e$ through the resistors 17 and 19 which is proportional to the voltage across the main conductors 30 and 31.

In an analogous manner, the heaters 18 and 20 are connected in a local series circuit with an auxiliary winding 221 which is similar to the auxiliary winding 21 of Fig. 1. The auxiliary winding 221 is inductively coupled to the voltage winding 10a and forces a current component $I_e$ through the heaters 18 and 20.

By inspection of Fig. 4, it will be noted that the auxiliary windings 121 and 221 are provided with centrally disposed terminals 124 and 224 which correspond to the terminal 24 of Fig. 1. The auxiliary winding 121 also has end terminals 122 and 123 which are connected, respectively, to the heaters 17 and 19. End terminals 222 and 223 of the auxiliary winding 221 are connected to the heaters 18 and 20.

It will be observed that the heaters 17 and 19 are in two arms of a parallel circuit which is connected between the terminal 124 and the current winding 11a. Consequently, current flowing in the conductor 30 divides to provide a current component $I_1$ in each of the heaters 17 and 19. Similarly, the heaters 18 and 20 are in two arms of a parallel circuit connected between the terminal 224 and the current winding 11b. Therefore, current flowing in the conductor 31 divides to provide a current component $I_2$ in each of the heaters 18 and 20. Instantaneous directions of current flow are indicated by arrows in Fig. 4. The relationship of parts is such that the current components add vectorially in the heaters 19 and 20 and subtract vectorially in the heaters 17 and 18. For this reason, rotation of the pointer associated with the heaters is in accordance with the maximum energy demand of the three-wire circuit.

The relationship of the windings is shown in Fig. 5 by a cross section through the voltage pole 6. It will be observed that the voltage winding 10a and the auxiliary winding 121 occupy the same positions relative to the magnetic structure 5 as the corresponding windings 10 and 21 of Fig. 2. The turns of the auxiliary winding 121 may be insulated from each other by an insulating ribbon 126 which corresponds to the insulating ribbon 26 of Figs. 2 and 3.

The auxiliary winding 221 is similar in construction to the auxiliary winding 121, but is so positioned that it surrounds both the auxiliary winding 121 and the voltage winding 10a. An insulating ribbon 226 which corresponds to the insulating ribbon 26 of Figs. 2 and 3 may be employed for insulating the turns of the auxiliary winding 221. The unusual simplicity and compactness of the windings is clearly shown in Fig. 5.

In order to show more clearly the convolutions of the windings 121 and 221, the thicknesses thereof have been somewhat exaggerated in Fig. 5.

Although the invention has been described with reference to certain embodiments thereof, numerous modifications are possible. Therefore, the invention is to be restricted only by the appended claims.

I claim as my invention:

1. In an alternating-current instrumentality of the type including a magnetic structure having an air gap, a plurality of coils associated with said magnetic structure for producing when energized a shifting magnetic field in said air gap, one of said coils comprising a plurality of side-by-side turns of electrical conductor for providing a coil having substantial length, and an electroconductive armature positioned for movement in said air gap by said shifting magnetic field, an auxiliary winding surrounding said one coil in inductively coupled relationship therewith, said auxiliary winding comprising a ribbon of electroconductive material having a width equal at least to a major portion of the length of said one coil, and the width of said ribbon being many times the thickness thereof, said ribbon being positioned with its width overlying a substantial portion of the length of said one coil.

2. In an alternating-current instrumentality of the type including a magnetic structure having voltage and current poles spaced to define an air gap therebetween, and voltage and current windings surrounding respectively said voltage and current poles for producing when energized a shifting magnetic field in said air gap, said voltage winding comprising a plurality of turns of electrical conductor arranged in side-by-side relation to produce a winding having substantial length, an auxiliary winding comprising a plurality of superimposed turns surrounding the voltage winding of said instrumentality, said auxiliary winding comprising a ribbon of electroconductive material having a width dimenson equal at least to a substantial portion of the length dimension of said voltage winding whereby each turn of said ribbon substantially surrounds said voltage winding, and the width of said ribbon being many times the thickness thereof, and a ribbon of insulating material having turns interleaved with the turns of said auxiliary winding.

3. In an alternating-current instrumentality of the type including a magnetic structure having voltage and current poles spaced to define an air gap therebetween, and voltage and current windings surrounding respectively said voltage and current poles for producing when energized a shifting magnetic field in said air gap, said voltage winding comprising a plurality of turns of electrical conductor arranged in side-by-side relation to produce a winding having substantial length, an auxiliary winding comprising a plurality of superimposed turns surrounding the voltage winding of said instrumentality, said auxiliary winding comprising a ribbon of electro-conductive material having a width dimension equal at least to a substantial portion of the length dimension of said voltage winding whereby each turn of said ribbon substantially surrounds said voltage winding, a conductor terminal extending transversely across each end of said ribbon, and a centrally disposed tap terminal extending transversely across said ribbon intermediate the ends thereof.

4. In an alternating-current instrumentality of the type including a magnetic structure having voltage and current poles spaced to define an air gap therebetween, and voltage and current windings surrounding respectively said voltage and current poles for producing when energized a shifting magnetic field in said air gap, said voltage winding comprising a plurality of turns of electrical conductor arranged in side-by-side relation to produce a winding having substantial length, an auxiliary winding surrounding said voltage winding and inductively coupled therwith, a second auxiliary winding surrounding said first auxiliary winding and inductively coupled with said voltage winding, each of said auxiliary windings comprising a ribbon of electroconductve material having a width dimension substantially equal at least to a substantial portion of the length dimension of said voltage coil, whereby each turn of said ribbon substantially surounds said voltage winding, and the width of said ribbon being many times the thickness thereof.

5. In an alternating-current measuring device for association with a thermal maximum demand unit of the type including an alternating-current meter comprising a magnetic structure having voltage and current poles spaced to define an air gap, and voltage and current windings surrounding said poles respectively for producing when energized a shifting magnetic field in said air gap, said voltage winding comprising a plurality of turns of electrical conductor arranged in side-by-side relationship to provide a voltage winding having substantial length, an auxiliary winding surrounding said voltage winding and inductively coupled therewith, said auxiliary winding comprising an electroconductive ribbon having a width dimension which is equal to at least a substantial portion of the length dimension of said voltage winding, a centrally disposed terminal for said auxiliary winding for connection in series relationship with said current windings, said terminal being disposed transversely of said ribbon intermediate the ends thereof, and a terminal at each end of said auxiliary winding for connection to said maximum demand unit.

6. In a watthour meter having a voltage winding formed of several hundred turns of small conductor, means for deriving from said voltage winding an electromotive force, said means comprising an auxiliary winding surrounding said voltage winding and inductively coupled thereto, said auxiliary winding comprising a ribbon conductor having a width dimension which is equal to at least a substantial portion of the length dimension of said voltage winding, whereby each turn of said auxiliary winding mechanically surrounds a large number of turns of said voltage winding, and the width of said ribbon being many times the thickness thereof.

THOMAS D. BARNES.